July 30, 1957 A. E. CUTLER 2,800,960
METAL CUTTING AND CRIMPING TOOL
Filed Oct. 27, 1955 5 Sheets-Sheet 1

INVENTOR
Adolphus E. Cutler
BY Oscar L. Spencer
ATTORNEY

July 30, 1957 A. E. CUTLER 2,800,960
METAL CUTTING AND CRIMPING TOOL
Filed Oct. 27, 1955 5 Sheets-Sheet 2
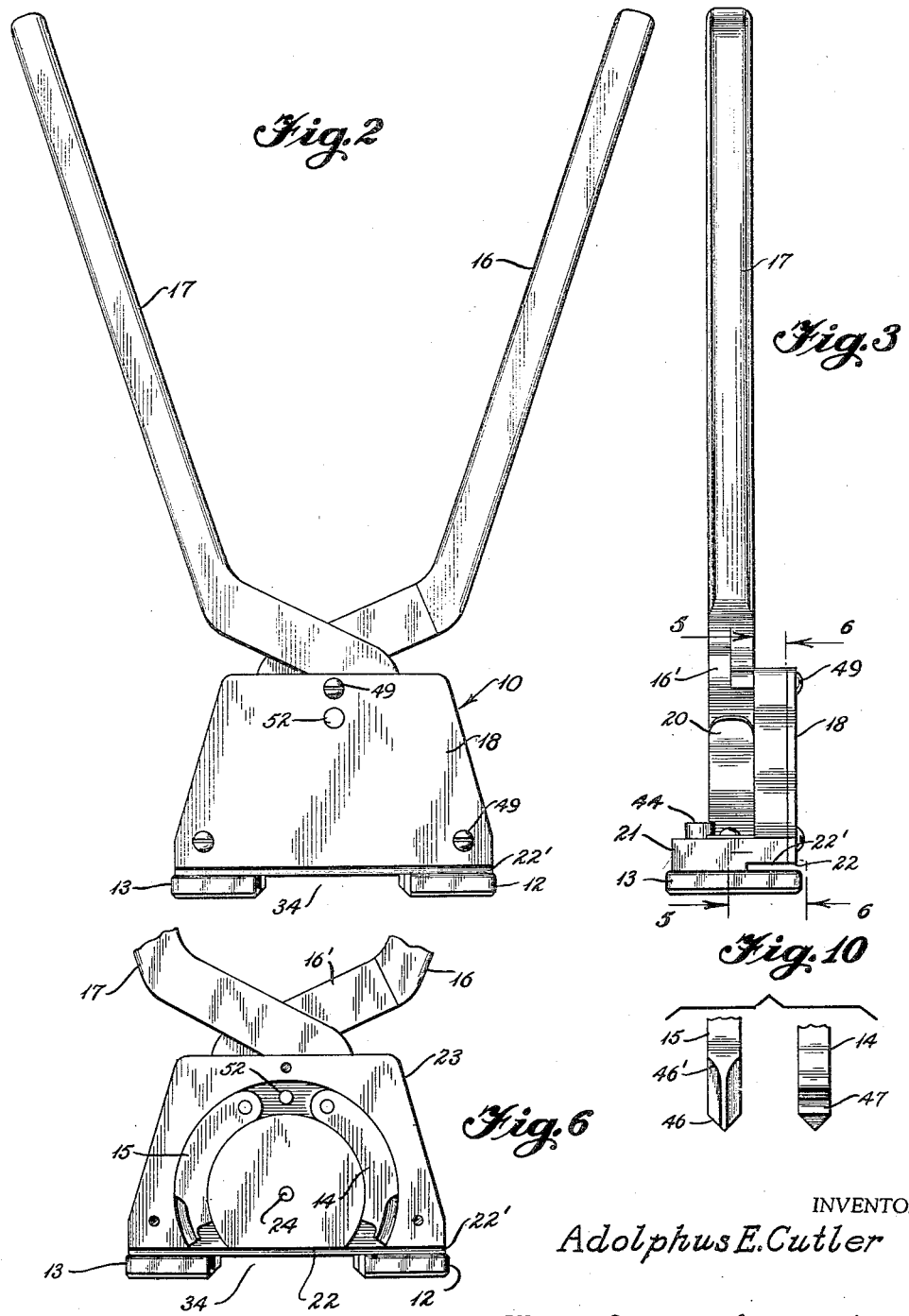
INVENTOR
Adolphus E. Cutler
BY Oscar L. Spencer
ATTORNEY July 30, 1957  A. E. CUTLER  2,800,960
METAL CUTTING AND CRIMPING TOOL
Filed Oct. 27, 1955  5 Sheets-Sheet 3
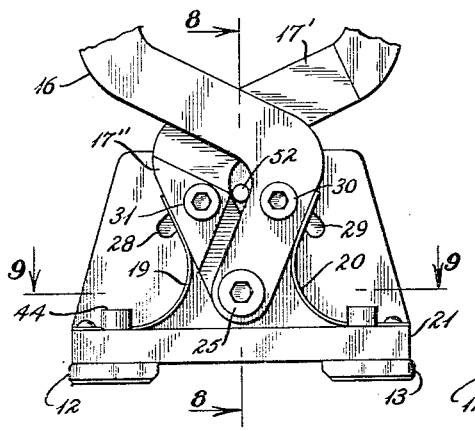
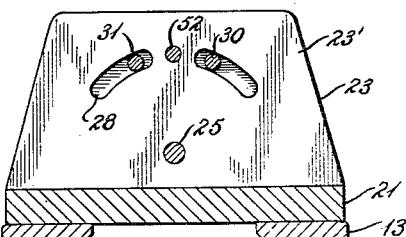
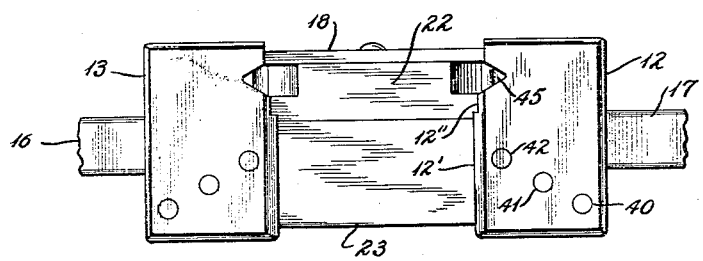
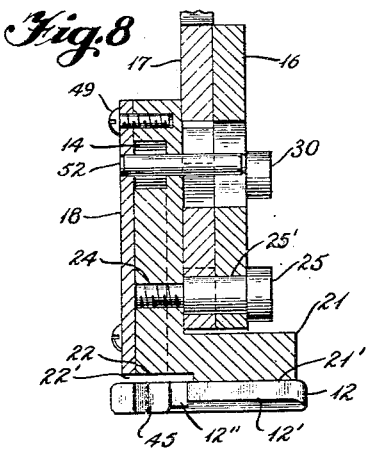
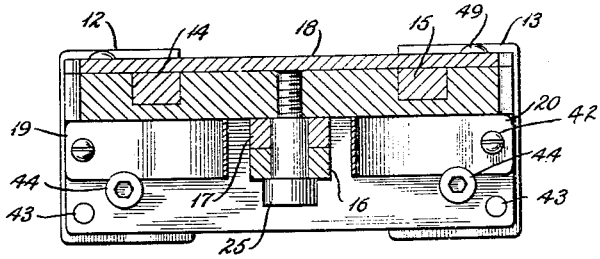
INVENTOR
Adolphus E. Cutler
BY Oscar L. Spencer
ATTORNEY July 30, 1957 A. E. CUTLER 2,800,960
METAL CUTTING AND CRIMPING TOOL
Filed Oct. 27, 1955 5 Sheets-Sheet 4
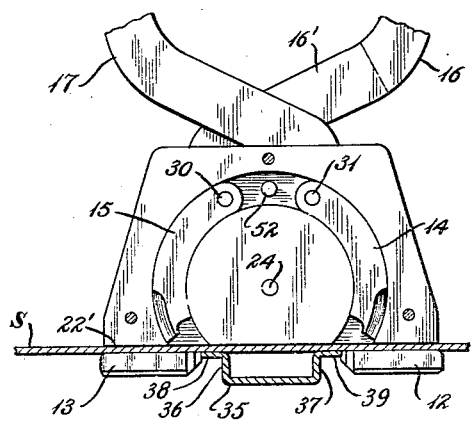
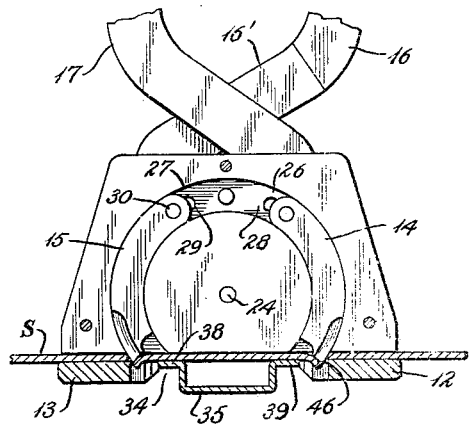
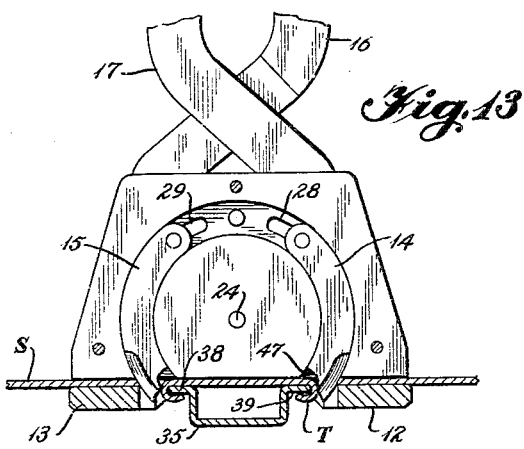
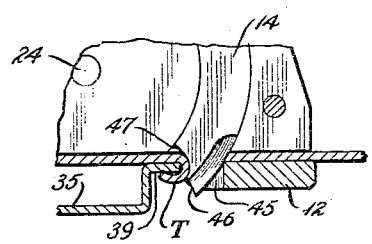
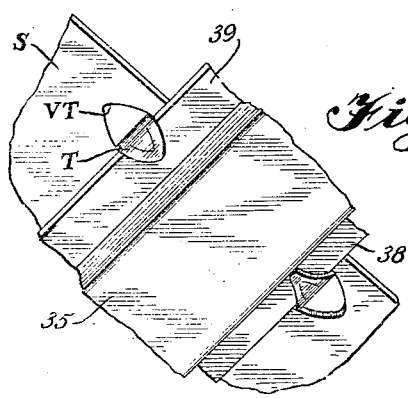
INVENTOR
Adolphus E. Cutler
BY Oscar L. Spencer
ATTORNEY

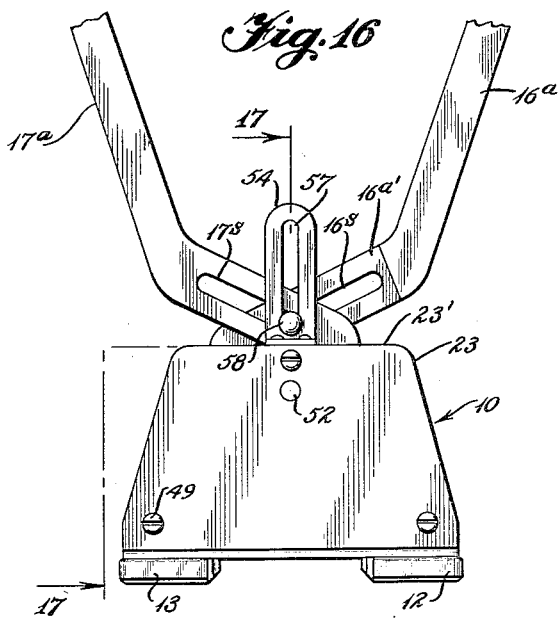
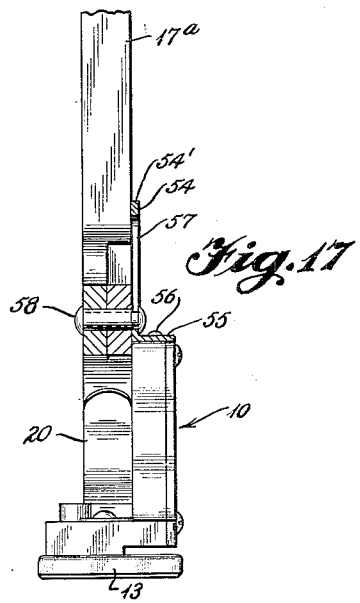
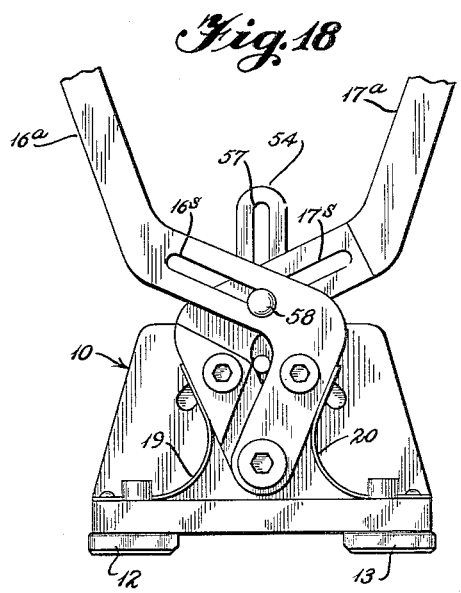
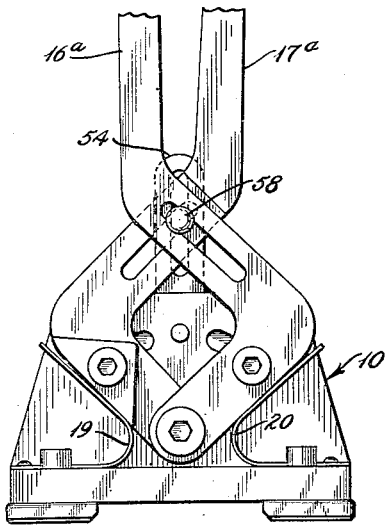

United States Patent Office 2,800,960
Patented July 30, 1957

2,800,960

METAL CUTTING AND CRIMPING TOOL

Adolphus E. Cutler, Kokomo, Ind., assignor to Pittsburgh Plate Glass Company, Allegheny County, Pa., a corporation of Pennsylvania Application October 27, 1955, Serial No. 543,165

5 Claims. (Cl. 164—120)

My invention is directed to a portable tool that may be placed against the edge of a sheet metal siding having a mounting strip therebehind to which the siding is to be secured wherein the tool cuts tabs in the siding and crimps them about the edges of the mounting strip.

In the present installation of metal facing or siding for store fronts and the like, the siding is secured to a backing of plywood or the like or on spaced furring strips by means of individually applying screws or nails through the edge of the siding to the support therebehind. This portion that is secured by screws or nails in each siding member is subsequently covered by an additional overlapping siding member portion. Such siding units are installed relatively slowly at high labor costs, and in addition, the plywood backing if used is expensive. According to my invention, installation costs for labor and materials are reduced by mounting the metal siding or facing members on spaced apart metal furring or mounting strips which have been installed on the front of the building. According to my invention I provide a special tool which cuts tabs out of the edge of the siding overlying the mounting strip and after cutting the tabs, crimps or bends same over the mounting strip.

It is an object of my invention to provide a light weight tool which may be positioned along the edge of a siding and receive therein the edges of a backing strip positioned behind the siding so that upon cutting metal tabs out of the elongated edge of the siding, they are positioned adjacent the edges of the mounting strip and crimped thereover to secure the siding to the mounting strip.

A further object of my invention is to provide a tool having an elongated slot therein for receiving an edge of a siding and a transverse recess therein for receiving a backing strip and a pair of oppositely disposed arcuate cutters which move about a common radius point and cut tabs in the siding and bend same over the furring strip.

Another object of my invention is to provide in a cutting and crimping tool a body portion and a transverse flange thereon with the body portion provided with die plates positioned adjacent an elongated slot and a channel way transverse thereto in the body portion for receiving the ends of arcuate cutting dies mounted in arcuate recesses in the flange and actuated by a pair of lever handles connected thereto.

Still further objects of my invention is to provide a cutting and crimping tool of lightweight construction having a minimum of parts that may be easily assembled and disassembled and which will be slidably mounted along a flat edge of a siding and receive therein in transverse manner the flanges of a furring channel so that movable cutting and crimping dies cut tabs in the siding and crimp them over the edge of the flanges of the channel of the furring strip and bend them up against the back thereof.

Still further objects and the entire scope of applicability of the present invention will become apparent from the detailed description given hereinafter; it should be understood, however, that the detailed description and specific examples are given by way of illustration only, and while indicating preferred embodiments of the invention are not given by way of limitation, since various changes and modifications within the spirit and scope of the invention will become apparent to those skilled in the art from this detailed description.

For a more complete understanding of the invention reference may be had to the drawings taken in connection with the specification and claims in which;

Fig. 2 is a front elevation of the assembled tool;

Fig. 3 is a side elevation of the tool as shown in Fig. 2;

Fig. 4 is a rear view of the bottom portion of the tool shown in Fig. 2;

Fig. 5 is a sectional view of the tool shown in Fig. 3 along line 5—5;

Fig. 6 is a view similar to Fig. 2 of the lower portion of the tool with the front plate removed as viewed along line 6—6 of Fig. 3;

Fig. 7 is a bottom plan view of the tool showing the die plates;

Fig. 8 is a sectional view along line 8—8 of Fig. 4 showing the siding receiving slot adjacent the base of the tool;

Fig. 9 is an enlarged cross-sectional view along line 9—9 of Fig. 4;

Fig. 10 is an enlarged front and rear view of the lower portion of the arcuate die;

Fig. 11 is a partial cross sectional view of the tool with cover plate removed with dies retracted and siding and furring strips in place;

Fig. 12 is a view similar to Fig. 11 with the dies starting to move into cutting position against the siding;

Fig. 13 is a view similar to Figs. 11 and 12 showing the crimping or bending action of the dies.

Fig. 14 is an enlarged detailed view of the bending portion of the die pushing home the cut tab against the bottom portion of the flange of the furring strip;

Fig. 15 is an enlarged isometric view showing the tabs and the siding crimped over the flanges of a furring strip which support the siding;

Fig. 16 is a modified form of handle arrangement for the cutting tool;

Fig. 17 is a sectional view along line 17—17 of Fig. 16;

Fig. 18 is a rear elevational view of the tool shown in Fig. 16; and

Fig. 19 is a view similar to Fig. 18 showing the pivotal position of the handles when drawn together from the position shown in Fig. 18 illustrating the guide for the handles causing simultaneous operation.

Throughout the description and the drawings like reference numerals refer to similar parts.

Figure 1:
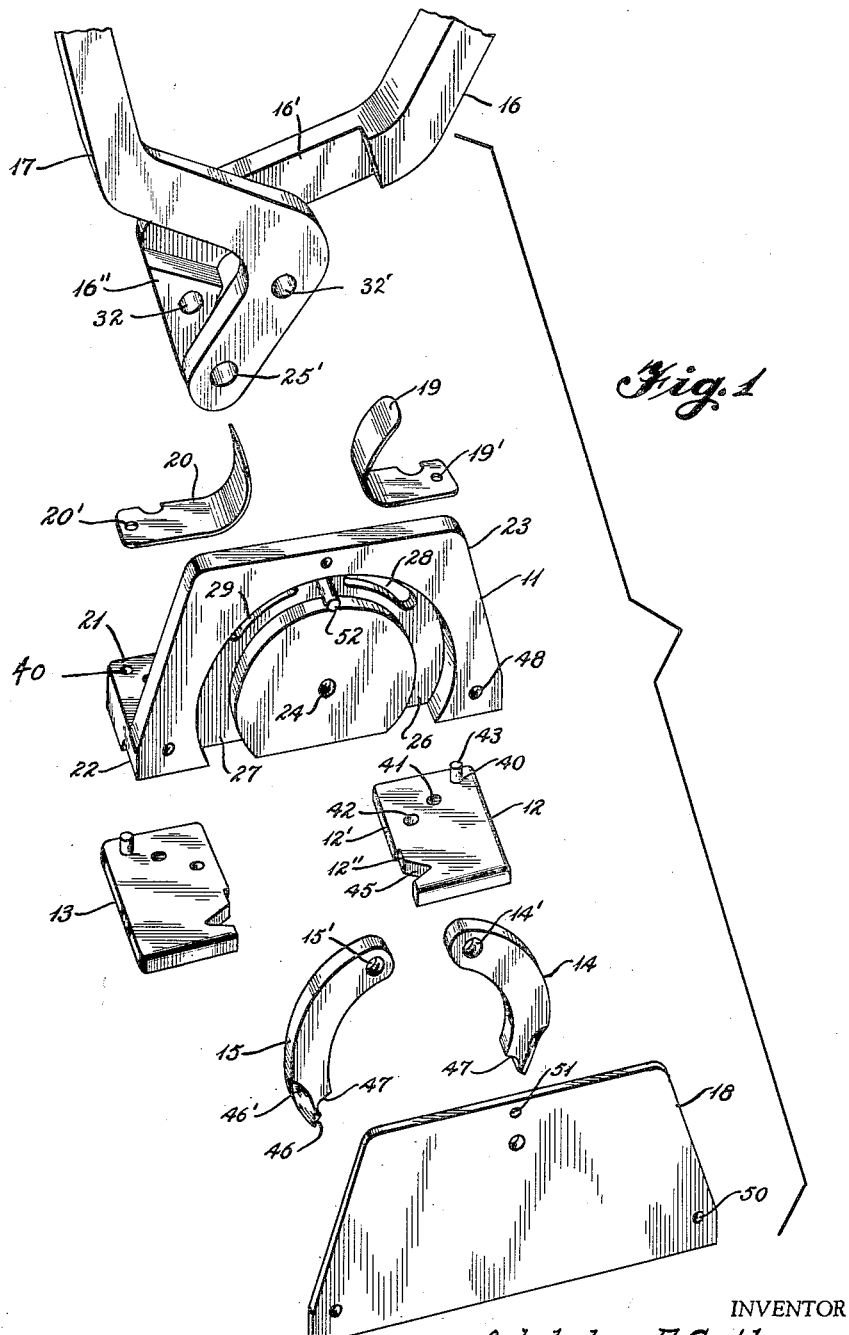
Fig. 1 is an exploded view on an enlarged scale of the parts going into the make-up of the cutting and crimping tool.

The cutting and crimping tool is generally indicated at 10 in Fig. 2 and reference to Fig. 1 shows that it is made up of a body portion 11, die plates 12 and 13 attachable to the bottom of the body 11, die members 14 and 15 which are received by the body member 11, and a pair of pivoted operating lever handles 16 and 17. Also included in the tool is a cover plate 18 for the die members and the body portion 11 and spring elements 19 and 20 attachable to the body portion and pressing against the handles causing them to assume their open position whereby the dies 14 and 15 are retracted in the body member 11.

The body portion 11 is formed by the generally flat bed portion 21, see Fig. 8, having along one edge an elongated offset face portion 22 which is offset inwardly from the bottom 21' of the bed plate. Body portion 11, see Fig. 1 has a transverse flange 23 extending to one side of the bed portion 21 and in an opposite direction from the inwardly offset face 22 such that the inwardly offset face 22 is positioned therebelow and it extends along what may be termed the front edge of the body. This body flange 23 as best shown in Fig. 1 is formed with a central radius point 24 which is a threaded aperture adapted to receive the threaded end of a shouldered screw 25 as shown in Fig. 8 which passes through suitable apertures in lever handles 16 and 17 and serves as a pivot for the handles. This body flange 23 is also formed with oppositely disposed arcuate slots 26 and 27 which extend to meld together at their top and have a common radius about the common central radius point 24. Formed in body flange 23 are arcuate slots 28 and 29 which communicate with the passageways 26 and 27 and extend to the rear face 23', see Fig. 5, of the body flange 23 and serve to receive shouldered screws 30 and 31 which extend through apertures 32 and 32' and handle 16 and handle 17 on into threaded apertures 14' and 15' formed in the upper ends of the die members 14 and 15 and thereby movement of the handles 16 and 17 about their pivot pin 25 which passes through a common aperture 25' in the handles causes the die members 14 and 15 to slide in guided relationship within the passageway 26 and 27 so as to bring the lower portions of the die members 14 and 15 down through the offset face portion 22 of the body member 11 as will hereinafter be described.

Attached to the bottom of the bed portion 21 of the body member 11 are die blocks 12 and 13 which blocks are generally rectangular in shape and affixed to the bottom of bed portion 21 in spaced apart relation whereby a central channel 34 is formed, see Fig. 2, for receiving a securing strip such as the channel shaped furring strip 35 as shown in Fig. 11. This furring strip 35 is here shown with upstanding leg portions 36 and 37 having oppositely extending flat flanges 38 and 39 at the tops thereof which lie adjacent and in a flat relationship against the elongated edge of a siding member S received adjacent the offset face 22 of the bed member 21 as will hereinafter be described.

Each of the die plates 12 and 13 are similar but reversed and thus only one will be described. Die plate 12 is formed with three in line apertures as indicated at 40, 41, and 42. Aperture 40 is provided with a dowel 43 which is received in a suitable aperture in alignment therewith in the bed portion 21. Aperture 41 is threaded to receive a securing cap screw 44 which extends through a suitable aperture in alignment therewith in the bed portion 21 as shown in Fig. 4. The other aperture 42 receives a dowel pin (not shown) affixed in the bed portion 21 and in alignment with the aperture 42. A die receiving passageway of V-shape is cut into the edge 12' of the die block adjacent to channel 34 as indicated at 45, see Fig. 1. The front face 12' adjacent the die receiving aperture 45 is cut back into the face as indicated at 12" a slight amount so as to provide for suitable clearance adjacent the channel 34 as shown in Fig. 2.

Reference to Fig. 10 shows for die member 15 a generally V-shaped cutting edge 46 which extends as a surface where it is faired off back into the tool adjacent the end as indicated at 46' and this cutting edge 46 of V-shape cooperates with the die receiving passageways 45 in the die plates 12 and 13 as shown in Figs. 12–14. This die leading portion 46 cuts a V-shape tab as shown in Fig. 15 out of the elongated edge of the siding S. The other face opposite to the cutting edge 46 and the faired off portion 46' of each cutting die is formed with an arcuate shaped bending portion 47 which is of a general cross sectional right angle shape as shown in Fig. 1, Figs. 11 and 12 but having a concave fillet in the corner thereof. Reference to Fig. 3 shows that there is formed between the die plates 12 and 13, particularly 13, as shown in Fig. 3, an elongated narrow passageway 22' between the face 22 in the bed plate portion 21 and the upper adjacent surface of the die plates 12 and 13 and this of course receives the elongated flat edge of the siding as well shown in Figs. 11– 14. It will be observed that the leading edge of the cutting dies 14 and 15 and the portions thereadjacent pass through the elongated slot 22' and there start their cut as shown in Fig. 12 for the tab T which is subsequently bent over the edge of flanges 38 and 39 and then against the backs thereof as indicated best in Fig. 14.

It will be noted in Fig. 1 that the handles 16 and 17 are formed with cut-away cooperating portions 16' and 17', respectively, to receive each other. Also the handles 16 and 17 have the bottom lugs 16" formed on the bottom ends within which extends the aperture 32 and 32', respectively, for receiving the bolts 30 and 31 which connect the handle with the die member. Spring members 19 and 20 are secured to the bottom by having the screws 42 pass through the apertures 19' and 20' thereof and the bottoms of the springs.

Reference to Fig. 1 shows that the front face of the body flange 23 is formed with tapped apertures 48 which receive securing screws 49, see Fig. 16, which pass through apertures 50 in face plate 18 to secure same in the body flange. The face plate also is provided with an aperture 51 which receives a centering pin 52, see Fig. 1, that extends out from the body flange 23.

Reference to Fig. 11 shows the elongated edge of the siding S inserted within the elongated narrower aperture 22' formed between the die plates 12 and 13 and the offset upper face 22 in the bed portion 21. The furring strip 35 having the oppositely disposed flanges 38 and 39 rests in flat relationship against the underneath side of the siding S and extends transverse thereto within the channel 34 formed between the die plates 12 and 13. The dies 14 and 15 are held by the handles 16 and 17 in upper position, said handles being held apart by the spring members 19 and 20.

Fig. 12 is similar to Fig. 11 but shows the movement of the handles being brought together about their pivot point 24 and the sliding movement of the die members 14 and 15 in their slots 26 and 27 respectively where they are not only supported but guided for arcuate movement about the radius center 24. The leading edge 46 of the die members cuts into the siding S with a V-shape cut as shown at VT in Fig. 15. The advance of the cutting dies 14 and 15 starts from the point of the cut VT and gradually widens as the die members progress arcuately downward through the strip S. Tab T which is formed is turned about the outer edge of the flanges 38 and 39, as best shown in Figs. 13 and 14, until it is fully wrapped around the edge and abuts the lower face of the flanges 38 and 39 since it is there pressed by means of the bending face 47 and the arcuate fillet surface on each die member. This movement is a continuous arcuate movement of cutting and bending. One inward movement of the handles 16 and 17 towards each other does the cutting and the bending as required to form the tabs T by the cutting and the bending so as to insert each tab in opposed positions over the flanges 38 and 39 of the furring strip 35. While I have here shown a channel shaped furring strip with the extending flat flanges, a flat backing strip may be used or backing strips of other shapes, however, the edge of the backing strip here shown is flat so as to receive the tab in tigh bent relation. It is within the scope of my invention to change the type of bending curve for face 47 in the ends of the cutting dies 14 and 15 so that the tab may be bent about other shaped surfaces. Within the scope of my invention and the disclosure herein shown it is possible that the tab might be bent about a circular configuration or bead along the backing member.

Reference will now be had to the modified form of guides for the handles as shown in Figs. 16–19, inclusive. This guide arrangement insures that the handles move in unison and apply a uniform cutting and bending of tabs at each side of the mounting strip. In all these figures the cutting and crimping tool is generally shown at 10 and is of like construction to that heretofore described. Each of the handles 16 and 17 as indicated at 16a and 17a which correspond to the handles 16 and 17 in the prior construction are formed with elongated slots 16s and 17s in the areas of their cut-away portions 16a' and 17a'. Secured to the upper face of the body flange 23 as indicated at 23' is an upstanding bracket 54 having a right angle base portion 55 which is apertured and receives screws 56 to secure it to the upper face 23' of the body flange 23. Bracket 54 has formed in its upright portion 54' an elongated slot 57 which is in alignment with the adjacent portion of elongated slots 16s and 17s lying therebehind. Passing through the aligned slots 16s, 17s, and 57 is a floating pin 58 which is riveted at each end as best shown in Fig. 17. This pin 58 floats with the movement of the handles and moves vertically within the slot 57.

Reference to Fig. 18 shows the rear view of Fig. 16 with the handles 16a and 17a in the outermost position and thus the die members are in their retracted position and the floating pin 58 is at the bottom of slot 57 of the upright member 54. Upright member 54 serves as a guide as does the slot 57 therein for up and down movement of the floating pin 58 as it moves up and down the slots 16s and 17s when the handles 16a and 17a are moved from outer position as shown in Fig. 18 to the innermost position as shown in Fig. 19. Thus, if one of the handles such as 16a is moved, motion is imparted to the other handle 17a and in turn to the die member moved thereby. This insures that uniform movement of the die members is obtained and cutting and bending of the tabs T occurs simultaneously. In this manner if a greater pressure is applied to one of the handles than the other, the pressure application is compensated so that die members 14 and 15 move in their advance and retraction at the same degree and thus the two tabs are cut and bent simultaneously.

While I have here disclosed a working form of the cutting and crimping or bending tool which has proved highly successful, it is contemplated that the claims of this application cover modifications within the scope of the invention. This tool is made of suitable aluminum or lightweight alloy castings where possible. Steel is used for parts such as die plates, dies, pins, and bolts. The tool is light in weight and may easily be handled and placed in position along the elongated upright edge of a siding or molding being placed on a store front or the like and in a position to receive within the recess 34 therein the backing member or furring strip such as 35 and in such a position it may easily be manipulated to form the tabs and bend same over the furring strip flanges. After making one fastening of tabs to furring strip the tool is pulled back off of the elongated edge of the siding S and replaced and slid again into position over the next furring or support strip.

I claim as my invention:

1. A clinching tool for forming a tab in metal siding and clinching it about an edge of a mounting strip, said siding having an elongated flat edge portion and said mounting strip being positioned behind the siding and extending generally transverse to the longitudinal edge and having edges lying in alignment with and against the rear of said siding, said tool comprising a body having a flat bed portion and a flange extending transversely from one edge to one side of the bed portion, said bed portion having an elongated slot extending into and across the bed portion below said flange to receive the elongated flat edge of said siding and a central recess in the bottom thereof transverse to the slot for receiving the mounting strip whose elongated flat edges lie against the flat edge portion of the siding, said body flange having therein a pair of oppositely disposed arcuate die receiving passageways opening at their bottoms into the elongated slot of the bed at a position adjacent the edges of the central recess and having a common central radius point in said body flange, said bed portion having cooperating die receiving openings in alignment with said arcuate passageways, said body flange having arcuate slotted openings extending from the arcuate die receiving passageways to a face of said flange and of like curvature to the die receiving passageways, an arcuate die element mounted for sliding and guided movement in each die passageway and having cutting and bending portions on the end thereof projectable into said elongated slot in the bed, through the die receiving opening and into said central channel receiving recess whereby the cutting portion cuts into the elongated flat edge of said siding placed in said elongated slot to form a tab and the bending portion bends the cut tab over the edge and under the adjacent back portion of said mounting strip, a pair of operating levers for said dies pivoted on a common pivot post whose axis lies perpendicular to a plane containing said dies, said common central radius point of said arcuate die receiving passageways and die members therein lying on said axis, and a pin means connecting said levers to said die members and extending through said arcuate slotted openings in communication with said arcuate die receiving passageways.

2. A clinching tool of the character described in claim 1 wherein said operating levers for said dies each have upper and lower overlying right angle end portions each apertured at the lower end of the lower portion where they are received over the common pivot post, said pins connecting the levers and die members being attached to the upper end of the lower right angle portions of each lever, handle portions on the upper ends of the upper right angle portions of the levers extending generally parallel to each other when the levers have moved the dies into cutting and crimping position, an upstanding bracket attached to said body flange and having an elongated slot extending adjacent the overlying upper ends of the upper right angle portions and lying about an axis extending between said central radius point and said handles, and a pin extending through said slot in the bracket for sliding movement up and down therein and interconnecting said levers thereadjacent whereby movement of one lever imparts similar movement to the other.

3. A clinching tool for forming a tab in metal siding and clinching it about an edge of a mounting strip, said siding having an elongated flat edge portion and said mounting strip being positioned behind the siding and extending generally transverse to the longitudinal edge and having edges lying in alignment with and against the rear of said siding, said tool comprising a body having a bottom bed portion with a flat bottom face having an inwardly offset elongated portion parallel thereto and along one edge and a flange extending transversely from the body portion on the opposite side thereof from the offset face portion, a die plate secured to the bottom face in spaced relation and at each end thereof whereby a central recess is formed between the edges extending generally transverse to the elongated offset face portion, said die blocks forming with the adjacent offset portions elongated narrow slots for receiving the elongated flat edge portion of the siding, said die plates having therein die receiving openings extending into the edge portions thereof in opposite directions from the central recess thereadjacent, said body flange having formed therein a pair of oppositely disposed arcuate die receiving passageways opening at their bottoms into the elongated narrow slots at a position adjacent the edges of the central recess and in alignment with said die receiving openings and having a common central radius point in said body flange, said body flange having arcuate slotted openings extending from the arcuate die receiving passageways to a face of said flange and of like curvature to the die receiving passageways, an arcuate die element mounted for sliding and guiding movement in each die passageway and having cutting and bending portions on the end thereof projectable into said elongated narrow siding edge receiving slot, through the die receiving opening in the die plates and into said central mounting strip receiving recess whereby the cutting portion cuts into the elongated flat edge of said siding placed in said elongated narrow slot to form a tab and said bending position bends the formed tab over the edge and under the adjacent back portion of said mounting strip, a pair of operating handle levers for said dies pivoted on a common pivot whose axis extends perpendicular to a plane containing said dies, said common central radius point of said arcuate die receiving passageways and die members therein lying on said axis, and a pin means connecting said levers to said die members and extending through said arcuate slotted openings in communication with said arcuate die receiving passageways.

4. A clinching tool of the character described in claim 3 wherein said die receiving openings in the die plates are V-shaped cuts extending into the die block with the widest portion of the cut opening into said adjacent central recess formed between the die blocks, said cutting portion on the end of the die element extending along the bottom of said element to a position spaced in from the lower end and of like V-shape in cross section to the V-shaped opening in the die block, said bottom portion of the V-shaped end of the die element projecting out beyond the lower end of the element, said lower end of the element above said projecting end terminating in a flat portion extending generally transverse to the cutting portion of the die and joining with the upper surface of the projecting cutting portion in a smooth concave fillet whereby said cut tab is bent in curved relation over the adjacent edge of said mounting strip.

5. A clinching tool of the character described in claim 3 wherein said operating levers for said dies each have upper and lower overlying right angle end portions each apertured at the lower end of the lower portion where they are received over the common pivot post, said pins connecting the levers and die members being attached to the upper end of the lower right angle portions of each lever, handle portions on the upper ends of the upper right angle portions of the levers extending generally parallel to each other when the levers have moved the dies into cutting and crimping position, an upstanding bracket attached to said body flange and having an elongated slot extending adjacent the overlying upper ends of the upper right angle portions and lying about an axis extending between said central radius point and said handles, and a pin extending through said slot in the bracket for sliding movement up and down therein and interconnecting said levers thereadjacent whereby movement of one lever imparts similar movement to the other.

References Cited in the file of this patent
UNITED STATES PATENTS

| | | |
|---|---|---|
| 1,354,150 | Ward | Sept. 28, 1920 |
| 1,430,807 | Hoffmann | Oct. 3, 1922 |
| 1,887,732 | Pagel et al. | Nov. 15, 1932 |
| 2,063,532 | Vertes | Dec. 8, 1936 |
| 2,687,661 | Richardson | Aug. 31, 1954 |